US009490976B2

(12) United States Patent
Ladak et al.

(10) Patent No.: US 9,490,976 B2
(45) Date of Patent: Nov. 8, 2016

(54) SYSTEMS AND METHODS FOR PROVIDING RECOMMENDATIONS TO OBFUSCATE AN ENTITY CONTEXT

(71) Applicant: WIPRO Limited, Bangalore (IN)

(72) Inventors: Akbar Abdulmalik Ladak, Bangalore (IN); Sreevidya Khatravath, Hyderabad (IN); Akash Gupta, Jaipur (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 14/553,696

(22) Filed: Nov. 25, 2014

(65) Prior Publication Data
US 2016/0094343 A1 Mar. 31, 2016

(30) Foreign Application Priority Data

Sep. 29, 2014 (IN) .......................... 4833/CHE/2014

(51) Int. Cl.
*H04L 9/08* (2006.01)
*G06K 9/00* (2006.01)
(52) U.S. Cl.
CPC .............. *H04L 9/0861* (2013.01); *G06K 9/00* (2013.01); *H04L 2209/16* (2013.01); *H04L 2209/805* (2013.01)
(58) Field of Classification Search
CPC ........................... G06F 17/30; G06F 17/3079
USPC ......................................................... 726/22
See application file for complete search history.

(56) References Cited

U.S. PATENT DOCUMENTS

2003/0014654 A1 1/2003 Adler et al.

2007/0041638 A1* 2/2007 Liu ..................... G06K 9/6282
382/170
2010/0146583 A1 6/2010 Prehofer et al.
(Continued)

FOREIGN PATENT DOCUMENTS

WO WO 2006/104810 A2 10/2006
WO WO 2006/104810 A3 10/2006
(Continued)

OTHER PUBLICATIONS

Extended European search report from the European Patent Office in counterpart European Patent Application No. EP 15 17 7786 mailed Jan. 14, 2016.

*Primary Examiner* — Beemnet Dada
*Assistant Examiner* — Kalish Bell
(74) *Attorney, Agent, or Firm* — Finnegan, Henderson, Farabow, Garrett & Dunner, L.L.P.

(57) ABSTRACT

Systems and methods for providing recommendations to obfuscate an entity context in a sensory environment are described. In one implementation, the method comprises receiving entity data and sensory environment data from a plurality of sources. Further, the method comprises analyzing the entity data to obtain categorized entity data. The categorized entity data comprises a plurality of features indicating characteristics of the entity context. Further, the method comprises analyzing the sensory environment data to obtain categorized sensory environment data. Further, the method comprises determining a correlation score for each of the plurality of features by correlating the categorized entity data and the categorized sensory environment data. Further, the method comprises recommending at least one of the plurality of features, based on the correlation score, to obfuscate the entity context in the sensory environment.

20 Claims, 4 Drawing Sheets

(56) References Cited

U.S. PATENT DOCUMENTS

| | | | |
|---|---|---|---|
| 2011/0041185 A1 | 2/2011 | Cohen et al. | |
| 2011/0096149 A1* | 4/2011 | Au | G06K 9/00771 348/47 |
| 2011/0150327 A1* | 6/2011 | Yoo | G06T 1/00 382/165 |
| 2013/0162818 A1* | 6/2013 | Lai | G06T 7/2093 348/143 |

FOREIGN PATENT DOCUMENTS

| | | |
|---|---|---|
| WO | WO 2013056407 | 4/2013 |
| WO | WO 2014/109645 A1 | 7/2014 |

\* cited by examiner

SYSTEMS AND METHODS FOR PROVIDING RECOMMENDATIONS TO OBFUSCATE AN ENTITY CONTEXT

TECHNICAL FIELD

This U.S. patent application claims priority under 35 U.S.C. §119 to: Indian Patent Application No. 4833/CHE/2014, filed Sep. 29, 2014. The aforementioned applications are incorporated herein by reference in their entirety

TECHNICAL FIELD

The present subject matter relates to recommender systems, and, particularly but not exclusively, to systems and methods for providing recommendations to obfuscate an entity context.

BACKGROUND

Context may be defined as a collection of facts that are used to describe the circumstances of an entity, such as a person, a place, a process, and a thing. The context may be categorized in different groups, such as an entity context, a device context, and an environmental context. In the entity context, facts related to entity personalization may be considered to define context of an entity. Similarly, facts related to technical terms may be considered to define the device context and facts related to location-based amenities may be considered to define the environment context. In an example, personalization features, such as shape, appearance, color, and size may describe the context for the entity, say, a product.

Context-awareness of an entity typically means unauthorized sharing of personal information in the public domain. In an example, such information is captured by multiple surveillance devices installed in various locations. Typically, entities are sensed by multiple sensors, such as an image based surveillance, an audio surveillance, and a derived surveillance. The entities are sensed by physical sensors, such as close-circuit television (CCTV) and satellite tracking in different scenarios. In an example, an individual (entity) in the physical context i.e. a person in a street/location may be detected by CCTV cameras and satellite surveillance. In another example, transportation of a product (entity) from port to warehouses may be tracked in a supply chain process as it is exposed to multiple sensors. Therefore, privacy becomes an issue due as many entities would not wish to disseminate personally identifiable information or context information to the public.

SUMMARY

Disclosed herein are systems and methods for providing recommendations to obfuscate an entity context in a sensory environment. In one example, the system comprises a processor, a memory communicatively coupled to the processor, wherein the memory stores processor-executable instructions, which, on execution, cause the processor to receive entity data and sensory environment data from a plurality of sources. The processor-executable instructions, on execution, further cause the processor to analyze the entity data to obtain categorized entity data. The categorized entity data comprises a plurality of features indicating characteristics of the entity context. The processor-executable instructions, on execution, further cause the processor to analyze the sensory environment data to obtain categorized sensory environment data. The processor-executable instructions, on execution, further cause the processor to determine a correlation score for each of the plurality of features by correlating the categorized entity data and the categorized sensory environment data. The processor-executable instructions, on execution, further cause the processor to recommend at least one of the plurality of features, based on the correlation score, to obfuscate the entity context in the sensory environment.

Certain embodiments of the present disclosure relates to a method for providing recommendations to obfuscate an entity context in a sensory environment comprises receiving entity data and sensory environment data from a plurality of sources. Further, the method comprises analyzing the entity data to obtain categorized entity data. The categorized entity data comprises a plurality of features indicating characteristics of the entity context. Further, the method comprises analyzing the sensory environment data to obtain categorized sensory environment data. Further, the method comprises determining a correlation score for each of the plurality of features by correlating the categorized entity data and the categorized sensory environment data. Further, the method comprises recommending at least one of the plurality of features, based on the correlation score, to obfuscate the entity context in the sensory environment.

Certain embodiments of the present disclosure also relate to a non-transitory, computer-readable medium storing instructions for providing recommendations to obfuscate an entity context in a sensory environment that, when executed by a processor, cause the processor to perform operations comprising receiving entity data and sensory environment data from a plurality of sources. Further, the operations comprise analyzing the entity data to obtain categorized entity data. The categorized entity data comprises a plurality of features indicating characteristics of the entity context. Further, the operations comprise analyzing the sensory environment data to obtain categorized sensory environment data. Further, the operations comprise determining a correlation score for each of the plurality of features by correlating the categorized entity data and the categorized sensory environment data. Further, the operations comprise recommending at least one of the plurality of features, based on the correlation score, to obfuscate the entity context in the sensory environment.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The present subject matter discloses systems and methods for providing recommendations to obfuscate an entity context. The systems and methods may be implemented in a variety of computing systems. The computing systems that can implement the described method(s) include, but are not limited to a server, a desktop personal computer, a notebook or a portable computer, and a mainframe computer. Although the description herein is with reference to certain computing systems, the systems and methods may be implemented in other computing systems, albeit with a few variations, as will be understood by a person skilled in the art.

To make recommendation for obfuscating an entity context, systems and methods of the present subject matter receive data related to an entity and a sensory environment from a plurality of sources. The data may be then analyzed to obtain categorized entity data and categorized sensory environment data. The categorized entity data and the categorized sensory environment data may be correlated to obtain a correlation score for features included in the data. Based on the correlation score, the present subject matter recommends at least one of features to a user to obfuscate the entity context.

Figure 1A:
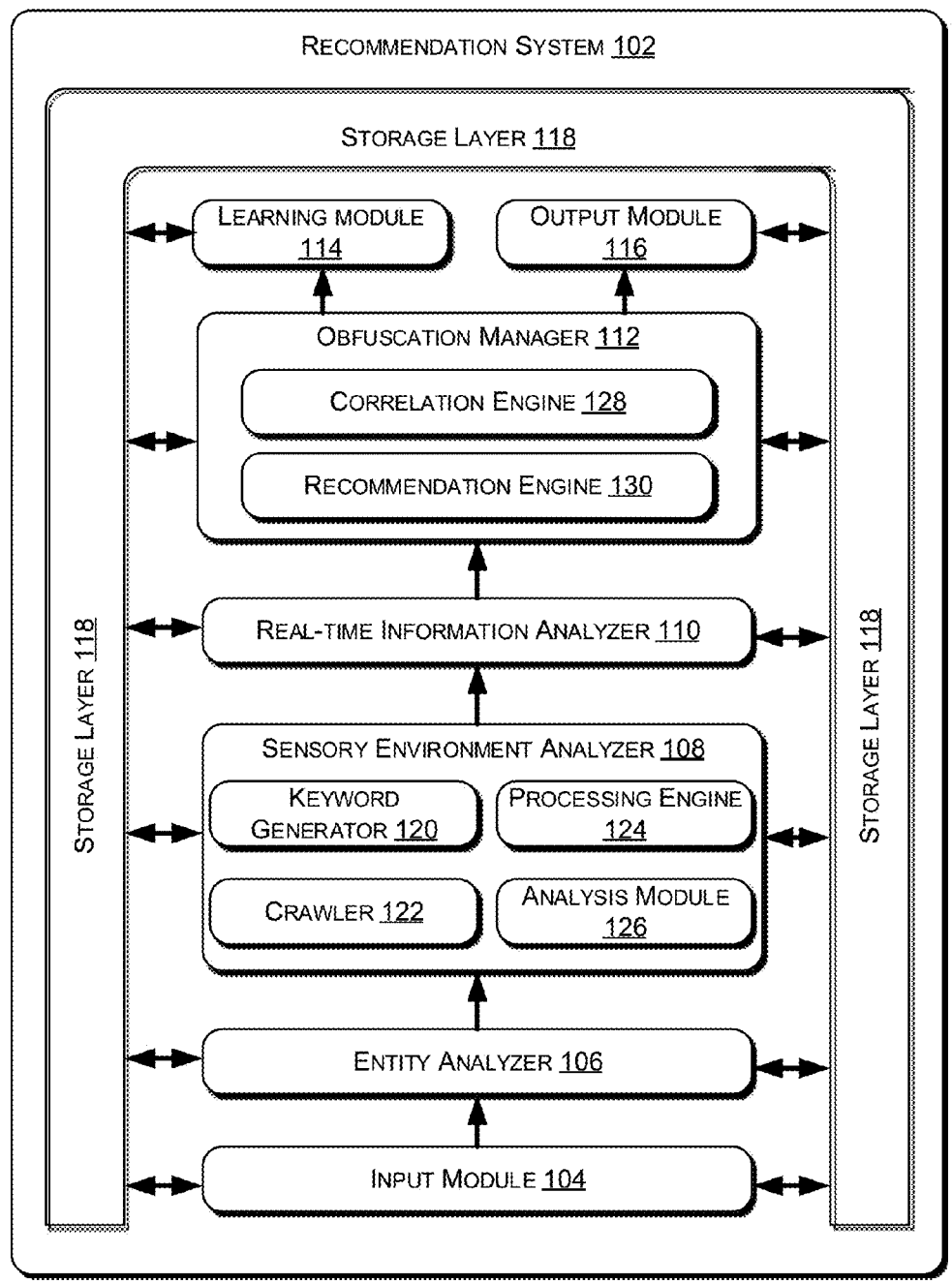
FIG. 1(a) illustrates a block diagram of a high-level architecture of an exemplary recommendation system, in accordance with some embodiments of the present disclosure.
Figure 1B:
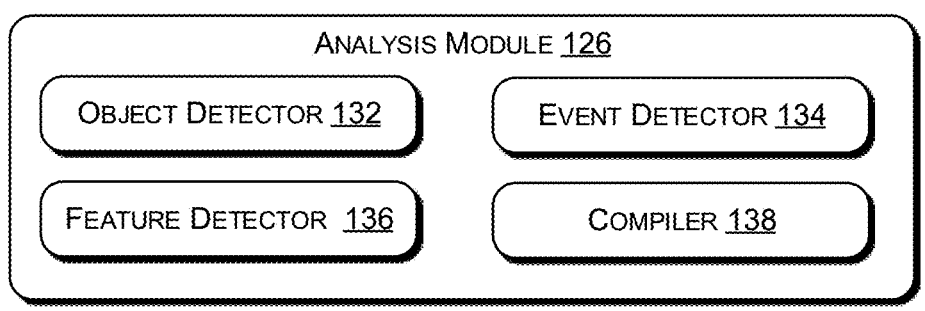
FIG. 1(b) illustrates components of an analysis module of the recommendation system, in accordance with some embodiments of the present disclosure.
Figure 2:
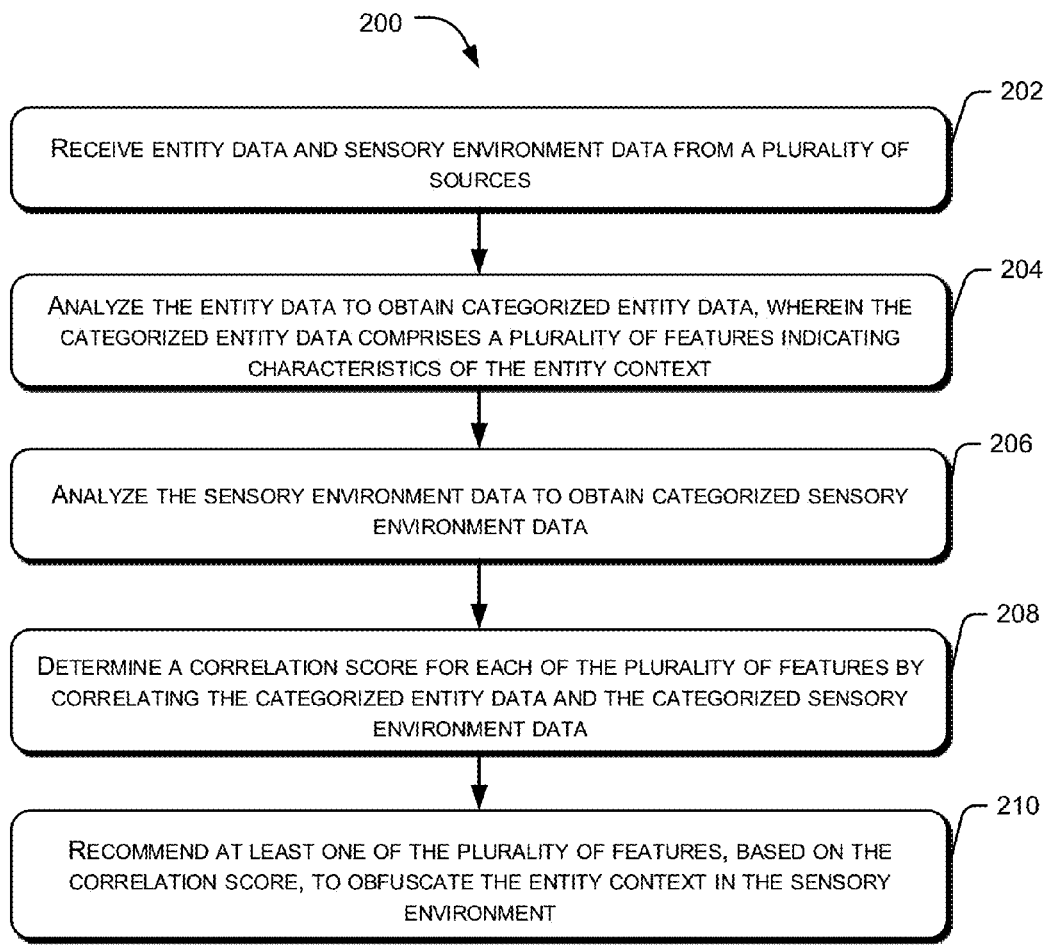
FIG. 2 illustrate an exemplary computer implemented method for providing recommendations to obfuscate an entity context in a sensory environment, in accordance with some embodiments of the present disclosure.
Figure 3:
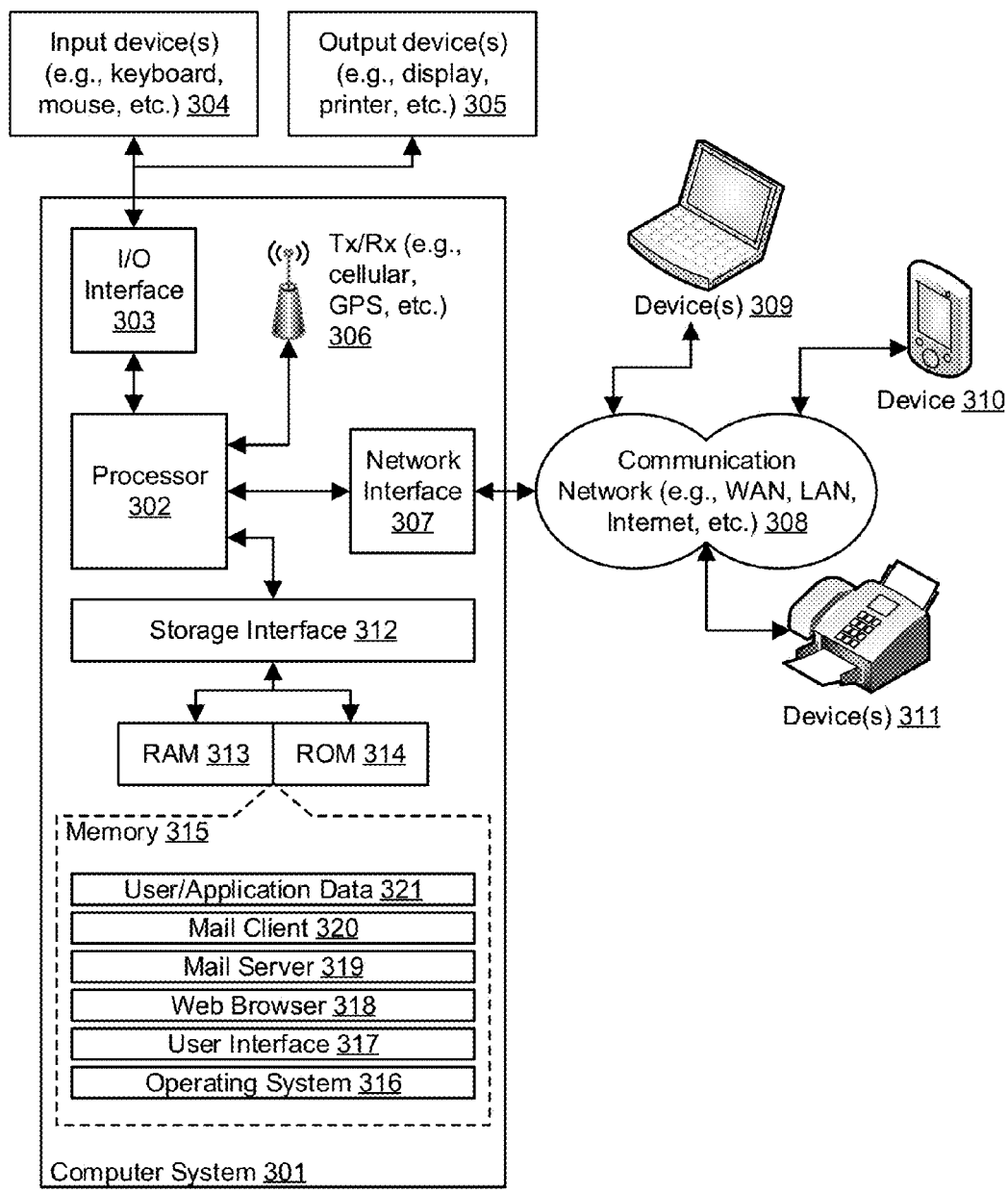
FIG. 3 is a block diagram of an exemplary computer system for implementing embodiments consistent with the present disclosure.

Working of the systems and methods for providing recommendations to obfuscate an entity context in a sensory environment is described in conjunction with FIGS. 1-3. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

FIG. 1(a) illustrates a block diagram of a high-level architecture of an exemplary recommendation system 102, in accordance with some embodiments of the present disclosure. The recommendation system 102, hereinafter may be interchangeably referred to as a system 102, comprises an input module 104, an entity analyzer 106, a sensory environment analyzer 108, a real-time information analyzer 110, an obfuscation manager 112, a learning module 114, an output module 116, and a storage layer 118.

Further, as shown in FIG. 1(a), the sensory environment analyzer 108 and the obfuscation manager 112 comprise sub-modules. The sensory environment analyzer 108 comprises a keyword generator 120, a crawler 122, a processing engine 124, and an analysis module 126. The obfuscation manager 112 comprises a correlation engine 128 and a recommendation engine 130.

In operations, to provide recommendations to a user to obfuscate an entity context, the input module 104 may receive entity data and sensory environment data from a plurality of sources. The entity data may comprise information about an entity whose context is to be obfuscated. Examples of the entity may include a person, a place, a process, and a thing. In an example, the entity data may include features, such as a photo, age, gender, built, type of vehicle, model and color of a vehicle, appearance of an object, and shape of an object. Examples of the sensory environment data may include information related to sensory environment, such as intended place of visit, preferred route, time of visit, duration of visit, and point where sensors are installed, and capturing region of the sensors.

The input module 104 may use data crawlers for obtaining the entity data and the sensory environment data from the plurality of sources, such as World Wide Web and data repositories. In an example, the input module 104 may instruct the user to provide the entity data and store in the storage layer 118 for future reference. To receive the entity data from the user, the input module 104 may generate at least one input field seeking the entity data from the user. The at least one input field may be defined for features for which data is not available. The input module 104 may then receive a user input having data about the features in the input fields. In this manner, the input module 104 receives information about the entity and aggregates the information to obtain the entity data with a 360 degree view about the entity. In another example, the input module 104 may obtain the entity data from the plurality of sources instead receiving data through a user input. Further, in case, any information relating to the entity is found missing or is incomplete, such as gender, age, and built, then input module 104 may retrieve data from social media profile of a person, blogs, and website of manufacturer of a product. The information which is explicitly available may be directly used by the input module 104 and rest may be extracted using image processing and text analysis.

Once the sensory environment data and the entity data are obtained, the entity analyzer 106 may retrieve the entity information from the input module 104 and the storage layer 118 and analyze the entity data to obtain categorized entity data. The categorized entity data comprises the entity data categorized into various features, like gender, ethnicity, color, type of vehicle, age, height, appearance of an object, shape of an object. The features may be decided based on type of the entity. For example, in case of a product, the features may be shape, size, and color of the product. Thus, the categorized entity data comprises a plurality of features indicating characteristics of the entity context. Further, the entity analyzer 106 may update the features considered for an entity periodically based on user inputs.

Similarly, the sensory environment analyzer 108 may retrieve the sensory environment data from the input module 104 and storage layer 118 and analyze the sensory environment data to obtain categorized sensory environment data. The categorized sensory environment data provides 360 degree view of a sensory environment. To obtain the categorized sensory environment data, the sensory environment analyzer 108 comprises various sub-modules.

The keyword generator 120 may generate keywords that are used as an input query to crawl data from the World Wide Web. The keyword generator 120 may generate the keywords based on the sensory environment data retrieved from the input module 104. For example, if the user has specified the name of place to be visited as "XYZ" then the keyword generator 120 may generate keywords, such as "XYZ security", "XYZ cameras", "XYZ night", "XYZ Video", "XYZ image", and there combination thereof.

Then, the crawler 122 may use the keywords as an input for crawling data from the internet and to extract all the information pertaining to sensory environment. The crawled information may include text, video, audio, and images. The crawler 122 may store the crawled data related to the sensory environment in the storage layer 118 for future reference.

Subsequently, the processing engine 124 may obtain the crawled data and convert it into a suitable format depending on the different types of data. In an example, in case of text data, the processing engine 124 may filter the text data and clean the text data by performing various transformations, such as lower case conversion, uniform resource locator (URL) removal, stop word removal, stemming, de-duplication, and special character removal. In case of audio, the processing engine 124 may covert the audio into text using speech to text convertors. Thereafter, the text may undergo same processing as mentioned for the text data. In case of video, the processing engine 124 may convert the video into frames. Then, the processing engine 124 may separate the audio and may process it as mentioned above.

Upon processing the crawled data, the analysis module 126 may perform various analytics to obtain complete 360 degree information about the sensory environment. Working of sub-modules of the analysis module 126 is explained in conjunction with FIG. 1(b).

FIG. 1(b) illustrates components of an analysis module 126 of the recommendation system 102, in accordance with some embodiments of the present disclosure. As shown in FIG. 1(a), the analysis module 126 comprises an object detector 132, an event detector 134, a feature detector 136, and a compiler 138. The object detector 132 may extract different kind of objects like type of sensors and entities based on data type. For example, if data type is 'text', then the object detector 132 may use techniques, such as object taxonomy, named entity recognition (NER), and part-of-speech (POS) tagging to retrieve the information about different kind of objects. Further, object taxonomy may be created by using publicly available data from the plurality of sources.

Then the sensory environment data may be sent to the event detector 134. The event detector 134 may determine information about the various kinds of events based on techniques, such as taxonomy and topic modelling. For example, various kinds of events like sports, political events, music events etc. happening at a particular location may be determined by the event detector 134 based on the data type. Further, event taxonomy may be created by using publicly available data obtained from plurality of sources.

The feature detector 136 may identify features, such as gender, color of clothes, ethnicity, hair style, and vehicle type from the objects and events detected by the object detector 132 and the event detector 134, respectively. Thereafter, the compiler 138 may receive input from the event detector 134, the object detector 132, and the feature detector 136 and compiles the input to obtain the categorized sensory environment data with a 360 degree view of the sensory environment.

Further, the real-time information analyzer 110 may collect real-time information about the sensory environment and provide it to the sensory environment analyzer 108. The sensory environment analyzer 108 may add the real-time information to the categorized sensory environment data. For example, if some new information is discovered from recent data, then the real-time information analyzer 110 may send the new information to the sensory environment analyzer 108 for analysis. The real-time analyzer may continuously monitor for new information related to the entity context and the sensory environment so as to keep the system 102 updated.

Upon obtaining the categorized entity data, the categorized sensory environment data, the obfuscation manager 112 may perform correlation of the categorized entity data, the categorized sensory environment data and provide recommendation for obfuscating the entity context based on the correlation. The obfuscation manager 112 comprises sub-modules for performing the correlation and the recommendation.

The correlation engine may correlate the categorized entity data and the categorized sensory environment data for determining a correlation score for each of the plurality features. The correlation score indicates a degree of similarity of a feature of the entity with respect to the categorized sensory environment data. In an example, the correlation engine may compile all the information received and correlate by text processing, image processing, and intelligent classification. Then, the correlation engine may arrange the categorized sensory environment data in a specific order, such as sensor locations, most prominent transportation type in that location and its features, most prominent entities features, most prominent path considered by entities to travel to the location. Similarly, the correlation engine may arrange the categorized entity data, for example, physical features of entity, features of transportations used, considering path to the reach location.

Subsequently, the correlation engine may correlate both the data, i.e., the categorized entity data and the sensory environment data to determine the correlation score for each of the features. In an example, if the categorized sensory environment data indicates a transportation vehicle in the format of text or image and it matches with entity's transportation vehicle information present in terms of text or image about the vehicles in the categorized entity data, then the correlation score is on a higher side. In another example, if entity's transportation has very low matching features, then the correlation score is on the lower side. In another example, if there are no matching features then the correlation score is assigned a zero value for that particular feature.

The correlation engine may also retrieve information from the real-time information analyzer 110 and upgrade the correlation score accordingly. Further, the correlation engine may also interact with the learning module 114 to update the correlation score. The learning module 114 may comprise information, such as user's queried location's 360 degree view. The learning module 114 may map such information similar and nearby popular locations. The learning module 114 may also receive a user feedback on recommendations. The user feedback may be used in enhancing future recommendations. In an example, if a location is classified similar to already visited location and user's feedback for that location has negative score/least scores for some of the proposed features submitted by the recommendation engine, the correlation score may be decreased by a significant factor for those features. In this manner, upon receiving inputs from the entity information analyzer, the sensory environment information analyzer, the real-time information analyzer 110, and the learning module 114, the correlation score for each of the features is determined.

The recommendation engine may then recommend at least one of the plurality of features from amongst the plurality of features to obfuscate the entity context. The recommendation engine makes the recommendation based on the correlation score of the feature. In an example, the recommendation engine may provide the recommendations in a recommendation list. The recommendation list may comprise the features with their correlation score. In one example, the recommendation engine may recommend the features with the correlation score higher than a threshold value. In an example, the recommendation engine may retrieve sensor features, regions with security guards and suggest alternate direction to be considered in that particular location either on the image of the sensor location or text information explaining the place where sensor or guard is located and alternate path to be considered. In another example, the recommendation engine may recommend predominant features in the environment, such as color and type to the user for entity's feature modification. In case where the entity is a person and predominant color is red in the sensory location, then use of red color may recommended to the person, and in case the entity is vehicle then red colored vehicle may be recommended by the recommendation engine. Further, features with the correlation score lower than the threshold value may be recommended for modification so that the correlation score of such features is improved and above the threshold value.

The recommendations are provided to the user through the recommendation list stored in the output module 116. The recommendation list may comprise the plurality of features with the correlation score and recommendations to improve the correlation score. It may be noted that higher the correlation score, higher is the possibility of obfuscating the entity context. Also, the output module 116 may receive the user feedback and send the user feedback to the learning module 114 so that further recommendations can be improved.

In one example, the recommendation engine may retrieve the categorized sensory environment data and make recommendation based on the categorized sensory environment data. In said example, the recommendation may not take input from the entity analyzer 106 and calculate the correlation score. This may be helpful in scenario where the entity data is not available with the system 102.

Further, the present subject matter is described below with the help of an example where the system 102 is implemented for providing recommendations to user to obfuscate the entity context. In an example, where the entity is a person and the person is planning to visit a location, the system 102 may recommend features to the person to obfuscate his/her identity in that particular location. The system 102 may gather the details of the person, i.e., the entity data, such as location planning to visit, starting location, age, gender, time of visit, duration of visit, vehicle, attire, baggage, and route planning to take. Once all the information about the entity is available with the system 102, the system 102 may retrieve information related to the sensory environment of the location from various data sources, such as internet, data repositories, and internal databases having details of previous recommendations related to same location. The system 102 may then analyze the sensory environment data and the entity data and categorize the sensory environment data and the entity data so that a 360 degree view of the data is obtained. The 360 degree view of the sensory environment data may have information, such as age of people, clothes, color of clothes, types of vehicle, most crowded timelines, sensor locations, sensor features, and route information. Subsequently, the system 102 may correlate the entity data and the sensory environment data to obtain the correlation score for each of the features. The features of the entity with the high correlation score are those features which have high degree of similarity with features of the sensory environment. Thereafter, based on the correlation score, the system 102 may provide the recommendation list comprising recommendation for the person to obfuscate his/her identity in the location. The system 102 may also monitor real-time data and update the correlation score accordingly so that recommendations provided are accurate. The recommendations may be further improved by the system 102 by considering the user feedback on the previous recommendations. In said example, the system 102 may recommend features, such as route to consider, transportations, type of clothes, color and time of visit to the person so that he/she can take appropriate measure before going to the location and obfuscate the entity context, i.e., identity of the person.

Thus, the system 102 of present subject matter enables obfuscation of the entity context by providing recommendations to the user. In the present subject matter, the recommended features are generated considering the original features of entities so that minimum modifications are required. Further, the system 102 monitors real-time information so that recommendations are improvised with respect to the recent events.

The system 102 may be used in various situations, such as obfuscating individual's identity, obfuscating products while shipping, and transportation obfuscation. Obfuscation of individual's identity may be needed in situations where a celebrity wants to obfuscate his/her indemnity in a public place. Obfuscating products while shipping may be needed to keep products secret from competitors, such a product to be launched soon and design of a product. The transport obfuscation may be needed where transport vehicles are used, such as a bank van transferring money.

FIG. 2 illustrate an exemplary computer implemented method for providing recommendations to obfuscate an entity context in a sensory environment, in accordance with some embodiments of the present disclosure.

The method 200 may be described in the general context of computer executable instructions. Generally, computer executable instructions can include routines, programs, objects, components, data structures, procedures, modules, and functions, which perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200 or alternative methods. Additionally, individual blocks may be deleted from the method 200 without departing from the spirit and scope of the subject matter described herein. Furthermore, the method 200 can be implemented in any suitable hardware, software, firmware, or combination thereof.

With reference to method 200 as depicted in FIG. 2, as shown in block 202, entity data and sensory environment data are received from a plurality of sources. The sensory data may comprise information about the entity. In an example, when some information about the entity is not available, the input module 104 may generate at least one input field seeking the entity data from a user. Then, the user may provide a user input in the at least one input field to complete to the missing information about the entity. Further, the input module 104 may receive the sensory environment information from sources, such as internet and data repositories. The sensory environment information comprises information related to the sensory environment, such as location, sensor features, place where sensors are installed, and capturing region of the sensors.

At block 204, the entity data is analyzed to obtain categorized entity data. The categorized entity data may comprise a plurality of features indicating characteristics of an entity context. In an example, the entity analyzer 106 may use various processing techniques on the entity data to obtain the categorized entity data. The features present in the categorized entity data may describe the entity context of the entity.

At block 206, the sensory environment data is analyzed to obtain categorized sensory environment data. In an example, the sensory environment analyzer 108 may analyze the sensory environment data to obtain the categorized sensory environment data providing a 360 degree view of the sensory environment. Further, the real-time information analyzer 110 may keep looking for new information related to the sensory environment so that the categorized sensory environment data is always updated. In case, the real-time information analyzer 110 identifies the new information about the sensory environment after the recommendations, the recommendation engine may consider the new information and make new recommendations to the user.

At block 208, a correlation score for each of the plurality of features is determined by correlating the categorized entity data and the categorized sensory environment data. In an example, the correlation engine may correlate the information received from the entity analyzer 106, the sensory environment analyzer 108, the real-time information analyzer 110, and the learning module 114 to obtain the correlation score for each of the features. In an example, the correlation engine may obtain the categorized sensory environment data and recommend features to the user by analyzing the categorized sensory environment data without determining correlation score and considering the categorized entity data.

At block 210, at least one of the plurality of features is recommended, based on the correlation score, to obfuscate the entity context in the sensory environment. In an example, the recommendation engine may provide a recommendation list to the user having at least one the plurality of features with the correlation score. The user may obfuscate the entity context based on the recommendations provided to the user. Also, the user may provide a user feedback on recommendations. The output module 116 may obtain the user feedback and send it to the learning module 114 so that further recommendations for obfuscating the entity context can be improved.

Computer System

FIG. 3 is a block diagram of an exemplary computer system for implementing embodiments consistent with the present disclosure. Variations of computer system 301 may be used for implementing any of the devices presented in this disclosure. Computer system 301 may comprise a central processing unit ("CPU" or "processor") 302. Processor 302 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 302 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 302 may be disposed in communication with one or more input/output (I/O) devices via I/O interface 303. The I/O interface 303 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 303, the computer system 301 may communicate with one or more I/O devices. For example, the input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 305 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 302. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 302 may be disposed in communication with a communication network 308 via a network interface 307. The network interface 307 may communicate with the communication network 308. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 307 and the communication network 308, the computer system 301 may communicate with devices 310, 311, and 312. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 301 may itself embody one or more of these devices.

In some embodiments, the processor 302 may be disposed in communication with one or more memory devices (e.g., RAM 313, ROM 314, etc.) via a storage interface 312. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 316, user interface application 317, web browser 318, mail server 319, mail client 320, user/application data 321 (e.g., any data variables or data records discussed in this disclosure), etc. The operating system 316 may facilitate resource management and operation of the computer system 301. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the computer system 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 301 may implement a web browser 318 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 301 may implement a mail server 319 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 301 may implement a mail client 320 stored program component. The mail client may be a mail viewing application, such as Apple Mail, Microsoft Entourage, Microsoft Outlook, Mozilla Thunderbird, etc.

In some embodiments, computer system 301 may store user/application data 321, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for providing recommendations to obfuscate an entity context in a sensory environment. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium"

should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A computer-implemented method for providing recommendations to a user to obfuscate an entity context in a sensory environment, the method comprising:
   receiving entity data and sensory environment data from a plurality of sources;
   analyzing, by a processor, the entity data to obtain categorized entity data, wherein the categorized entity data comprises a plurality of features indicating characteristics of the entity context;
   analyzing, by the processor, the sensory environment data to obtain categorized sensory environment data;
   determining, by the processor, a correlation score for each of the plurality of features by correlating the categorized entity data and the categorized sensory environment data; and
   recommending, by the processor, at least one of the plurality of features, based on the correlation score, to obfuscate the entity context in the sensory environment, wherein the recommending comprises at least one of:
      recommending the at least one of the plurality of features requiring a minimum modification to obfuscate the entity context in the sensory environment, and
      recommending the at least one of the plurality of features requiring a maximum modification to obfuscate the entity context in the sensory environment.

2. The method of claim 1, wherein analyzing the sensory environment data further comprises retrieving real-time data to be added to the categorized sensory environment data upon identifying new information related to the sensory environment.

3. The method of claim 1, wherein receiving the entity data further comprises:
   generating at least one input field seeking the entity data from the user; and
   obtaining a user input in the at least one input field from the user.

4. The method of claim 1, wherein recommending the at least one of the plurality of features comprises generating a recommendation list for the user, wherein the recommendation list comprises the at least one of the plurality of features associated with the correlation score.

5. The method of claim 1 further comprises receiving a user feedback on recommendations, provided in a recommendation list, to improve further recommendations.

6. A recommendation system for providing recommendations to a user to obfuscate an entity context in a sensory environment, the recommendation system comprising:
   a processor operatively coupled to a memory device, wherein the processor is configured to execute instructions stored in the memory device to perform operations comprising:
      receiving entity data and sensory environment data from a plurality of sources;
      analyzing the entity data to obtain categorized entity data, wherein the categorized entity data comprises a plurality of features indicating characteristics of the entity context;
      analyzing the sensory environment data to obtain categorized sensory environment data;
      determining a correlation score for each of the plurality of features by correlating the categorized entity data and the categorized sensory environment data; and
      recommending at least one of the plurality of features, based on the correlation score, to obfuscate the entity context in the sensory environment, wherein recommending comprises at least one of:
         recommending the at least one of the plurality of features requiring a minimum modification to obfuscate the entity context in the sensory environment, and
         recommending the at least one of the plurality of features requiring a maximum modification to obfuscate the entity context in the sensory environment.

7. The system of claim 6, wherein the operations of analyzing the sensory environment data further comprise retrieving real-time data to be added to the categorized sensory environment data upon identifying new information related to the sensory environment.

8. The system of claim 6, wherein the operations of receiving the entity data further comprise:
   generating at least one input field seeking the entity data from the user; and
   obtaining a user input in the at least one input field from the user.

9. The system of claim 6, wherein operations of recommending the at least one of the plurality of features comprise generating a recommendation list for the user, wherein the recommendation list comprises the at least one of the plurality of features associated with the correlation score.

10. The system of claim 6, wherein the operations further comprise receiving a user feedback on recommendations, provided in a recommendation list, to improve further recommendations.

11. A non-transitory, computer-readable medium storing instructions for providing recommendations to a user to obfuscate an entity context in a sensory environment that, when executed by a processor, cause the processor to perform operations comprising:
   receiving entity data and sensory environment data from a plurality of sources;
   analyzing the entity data to obtain categorized entity data, wherein the categorized entity data comprises a plurality of features indicating characteristics of the entity context;
   analyzing the sensory environment data to obtain categorized sensory environment data;
   determining a correlation score for each of the plurality of features by correlating the categorized entity data and the categorized sensory environment data; and
   recommending at least one of the plurality of features, based on the correlation score, to obfuscate the entity context in the sensory environment, wherein recommending comprises at least one of:
      recommending the at least one of the plurality of features requiring a minimum modification to obfuscate the entity context in the sensory environment,
      recommending the at least one of the plurality of features requiring a maximum modification to obfuscate the entity context in the sensory environment.

12. The computer-readable medium of claim 11, wherein the operations of analyzing the sensory environment data further comprise retrieving real-time data to be added to the categorized sensory environment data upon identifying new information related to the sensory environment.

13. The computer-readable medium of claim 11, wherein the operations of receiving the entity data further comprise:
   generating at least one input field seeking the entity data from the user; and
   obtaining a user input in the at least one input field from the user.

14. The computer-readable medium of claim 11, wherein operations of recommending the at least one of the plurality of features comprise generating a recommendation list for the user, wherein the recommendation list comprises the at least one of the plurality of features associated with the correlation score.

15. The computer-readable medium of claim 11, wherein the operations further comprise receiving a user feedback on recommendations, provided in a recommendation list, to improve further recommendations.

16. The method of claim 1, wherein the entity data is independent of or remote from the sensory environment data.

17. The method of claim 1, wherein the categorized sensory environment data comprises a plurality of features indicating characteristics of the sensory environment.

18. The method of claim 1, wherein the correlation score is indicative of a degree of similarity of a feature of the entity context with respect to the categorized sensory environment data.

19. The method of claim 1, wherein recommending comprises at least one of:
   recommending the at least one of the plurality of features corresponding to at least one of a plurality of predominant features in the sensory environment, and
   recommending the at least one of the plurality of features requiring improvement in the corresponding correlation score.

20. The system of claim 6, wherein recommending comprises at least one of:
   recommending the at least one of the plurality of features corresponding to at least one of a plurality of predominant features in the sensory environment, and
   recommending the at least one of the plurality of features requiring improvement in the corresponding correlation score.

* * * * *